US010675724B2

(12) United States Patent
Edmondson

(10) Patent No.: US 10,675,724 B2
(45) Date of Patent: Jun. 9, 2020

(54) SWARF AND LUBRICANT RECOVERY SYSTEM

(71) Applicant: Justin Edmondson, Seguin, TX (US)

(72) Inventor: Justin Edmondson, Seguin, TX (US)

( * ) Notice: Subject to any disclaimer, the term of this patent is extended or adjusted under 35 U.S.C. 154(b) by 150 days.

(21) Appl. No.: 15/972,175

(22) Filed: May 6, 2018

(65) Prior Publication Data

US 2018/0318976 A1 Nov. 8, 2018

Related U.S. Application Data

(60) Provisional application No. 62/502,697, filed on May 7, 2017.

(51) Int. Cl.
| | |
|---|---|
| *B23Q 11/10* | (2006.01) |
| *B01D 36/04* | (2006.01) |
| *B01D 21/26* | (2006.01) |
| *C10M 175/00* | (2006.01) |

(52) U.S. Cl.
CPC ........ *B23Q 11/1069* (2013.01); *B01D 21/262* (2013.01); *B01D 36/045* (2013.01); *C10M 175/0058* (2013.01); *B01D 2221/08* (2013.01); *B01D 2221/14* (2013.01)

(58) Field of Classification Search
CPC ................................................ B01D 36/045; B01D 21/262; B01D 2221/14; B01D 2221/08; B23Q 11/1069; C10M 175/0058
See application file for complete search history.

(56) References Cited

U.S. PATENT DOCUMENTS

2013/0122575 A1* 5/2013 Revankar Krishna Prasad ........... C12M 21/12
435/287.1

* cited by examiner

*Primary Examiner* — Krishnan S Menon
*Assistant Examiner* — Waqaas Ali

(57) ABSTRACT

A mobile system and method for separating lubricants from swarf material streams provides on-site recovery of lubricants in an efficient, effective, sustainable and economic manner. The system thus reduces the need to transport relatively large volumes of swarf and lubricant material stream to a remote location for disposal. The system includes swarf of various types, for example, aluminum, steel, precious metals, plastic, etc. mixed with various water based or oil based lubricants. A trailer or motor vehicle containing a power supply, a basket centrifuge(s) connected to the power supply for powered operation thereof, a live bottom conveyor for supplying swarf to the centrifuges, a portable feed hopper with attached augers for supplying swarf to the live bottom conveyor, a bag liner to filter the extracted lubricant as it exits the basket, a crane for lifting the bag liner out of the basket, a container to accumulate the dried swarf, a container to accumulate the extracted lubricant.

7 Claims, 10 Drawing Sheets

SWARF AND LUBRICANT RECOVERY SYSTEM

PRIORITY CLAIM

This application claims priority to U.S. Provisional Patent Application Ser. No. 62/502,697 filed May 7, 2017, and which is incorporated herein for all purposes.

FIELD OF THE INVENTION

This invention pertains generally to a method and system for separating solids from a fluid-solid mixture and, more particularly, it relates to a method and system for separating lubricants from swarf material streams. Swarf is a term used by the machining industry for a material comprised of fine chips or filings of stone, metal, plaster or other material generated during the machining process. For the present disclosure the term "swarf" includes any oily sludge, filter media, hone mud, and/or grinding sludge.

BACKGROUND OF THE INVENTION

The machining industry is struggling for an economical method and system for separating the lubricant from the swarf material streams and filtering or cleaning the lubricant sufficiently, so as to be reused in the machining process or sold for beneficial reuse or recycled.

Furthermore, many companies are striving to discontinue disposing of waste via landfills. When faced with the high cost of other methods of disposal most companies choose landfill as the preferred method of disposal.

Many companies also have goals to eliminate waste or at least reduce, reuse, or recycle their waste streams.

Some processes exists to aid machining companies that generate swarf material with residual lubricant contamination, however these systems are not effective for swarf material with higher volumes of lubricant contamination. Processes also exists for lightweight swarf, however these systems are not effective in managing large volumes of lightweight material.

Additionally, heavy swarf streams are very difficult to convey and present a significant problem for existing technology. Although a system can be designed to manage a heavy swarf material stream, they have several disadvantages including costs, maintenance, and a large footprint is required.

Chip wringers can remove residual lubricant from chips generated during the machining process. However, they are not economical or effective at removing lubricants from swarf streams that are heavily saturated with lubricants. Furthermore, chip wringers are not economical or effective for swarf streams that are extremely dense as those generated in a grinding operation. A grinding operation generates very fine particles similar to grains of sand.

Briquette machines are also effective in solving the problem for swarf streams that contain residual oil. However they are not effective on swarf streams that contain high percentages of lubricant.

Permanent in-plant systems can be designed to manage a multitude of swarf material streams. However, they have a very large footprint and require a great deal of valuable plant space, consume a significant amount of energy to operate and require a significant amount of specialized maintenance. These systems are also extremely expensive. Another downside of in-plant systems is its scalability. Further, these systems are typically limited to managing a single swarf stream coming from a particular process in the facility. Further, a piece of scrap metal is inadvertently introduced to the feeding system; the entire system could be damaged.

It is apparent now that numerous innovations for separating lubricants from swarf material streams have been developed in the prior art that are adequate for various purposes. For example, U.S. Pat. Nos. 6,143,170 and 6,383,394 disclose and teach systems for recovery of solvents, oils, and other hydrocarbons from sorbent articles such as rags, wipes and absorbent pods. These prior art disclosures do not discuss swarf and teach manually loading swarf into top loading centrifuges with shovels. Such manual loading creates significant safety concerns. Furthermore, even though these innovations may be suitable for the specific purposes to which they address, accordingly, they would not be suitable for the purposes of the present invention as heretofore described. Thus a method and system for separating lubricants from swarf material streams and simultaneously to overcome the problems of the prior art as listed above is needed.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," or "side" views, such references are merely descriptive and do not imply or require that the invention be implemented or used in a particular spatial orientation unless explicitly stated otherwise.

Figure 1:
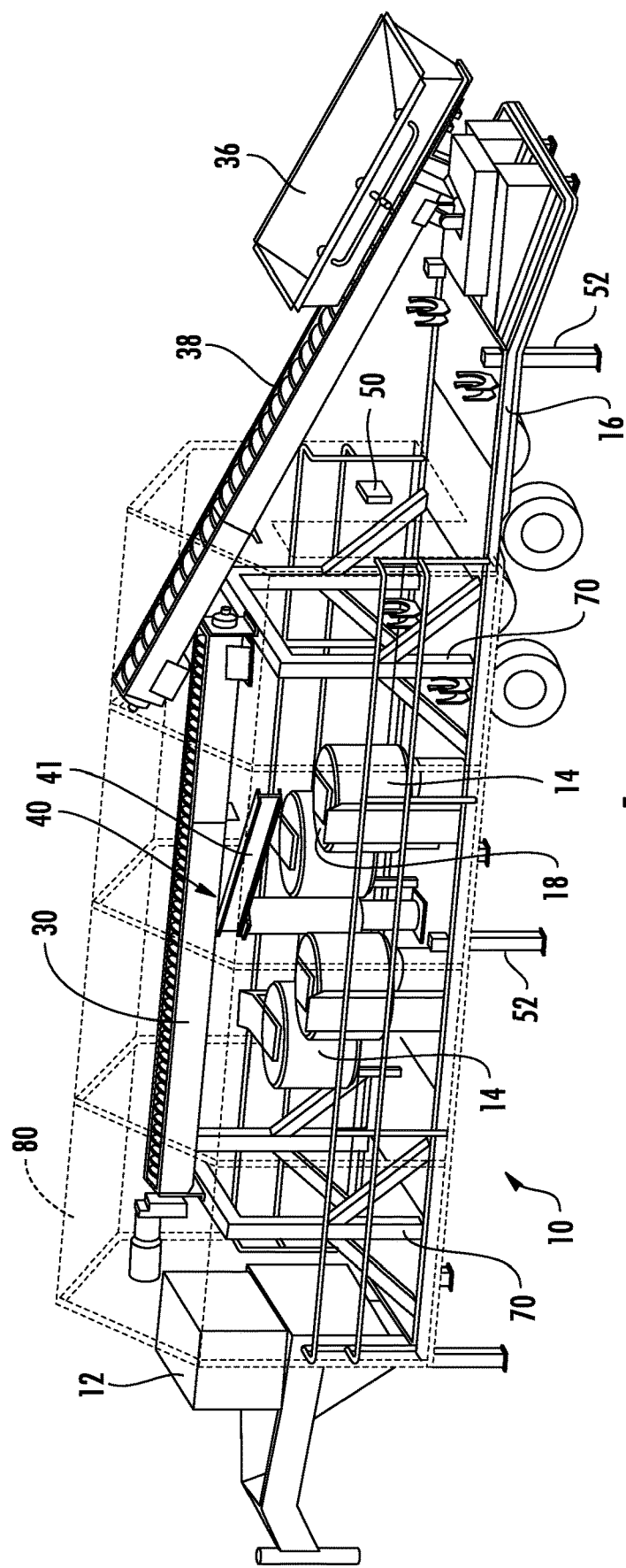
FIG. 1 is a left side perspective view of the mobile swarf and lubricant recovery system mounted on a vehicle trailer. The canopy or covering is illustrated in broken lines.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time to time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The figures illustrate that the present invention is directed towards a method and system for separating lubricants from swarf material streams, wherein the system is a mobile system that can be used to provide services at the customer's location. As previously stated, swarf is a term used by the machining industry for a material comprised of fine chips or filings of stone, metal, plastic or other material generated during the machining process. A lubricant is typically used during the machining process to cool the material being machined and flush the swarf. This results in a material stream of swarf combined with the lubricant. The lubricant can be oil or water based. The lubricant can represent as much as 75% of the volume of this material stream. The lubricant has extremely significant economic value. This would be a massive cost savings for companies who generate large quantities of this material stream. If the solid or dry swarf has economic value then it too can be recycled by using the system and method of the present invention. For example in metal machining the swarf would be a precious metal, such as. steel, titanium, copper, etc. thus such recovered swarf material has extremely significant economic value.

The system and method of the present invention includes swarf of various types, for example, aluminum, steel, precious metals, plastic, etc. mixed with various water based or oil based lubricants. The figures show a trailer, skid, or motor vehicle containing a power supply, a basket centrifuge(s) connected to the power supply for powered operation thereof, a live bottom conveyor for supplying swarf to the centrifuges, a portable feed hopper with attached augers or conveyor belts for supplying swarf to the live bottom conveyor, a bag liner to filter the extracted lubricant as it exits the basket, a crane for lifting the bag liner out of the basket, a container to accumulate the dried swarf, a container to accumulate the extracted lubricant.

The system is positioned on a trailer, a skid, or motor vehicle for transport to a remote site containing the swarf and lubricant material stream. The centrifuge(s) include a housing cover and a rotatable basket received within an interior portion of the centrifuge defined by the housing and cover and configured for receiving a plurality of swarf and lubricant material streams. Rotation of the basket during use of the system applies centrifugal force to the swarf and lubricant material stream for extractive removal of the lubricant therefrom such that the fluids travel from the swarf, through the bag liner, through the basket into an annular area between the basket and the housing. The system further includes a collection system in flow communication with the annular area for receiving the lubricants removed from the swarf and a container for the processed (dry) swarf.

In another aspect, the invention provides a portable system for recovering lubricants from the swarf and lubricant material stream. The system includes a trailer or motor vehicle and a basket centrifuge(s) having a housing and a rotatable basket removably attached to a spindle in the housing, the centrifuge being attached to the vehicle for transport to a remote site the basket having a solid base having a mass sufficient to provide self-balancing rotation of the basket and the basket being configured for receiving a plurality of swarf and lubricant material therein. Rotation of the centrifuge basket applies sufficient centrifugal force to the swarf and lubricant material to cause removal of lubricants therefrom such that the fluids travel through the bag liner, from the basket into an annular area between the basket and the housing and from the housing to a fluid recovery container and the swarf is essentially fluid free.

In yet another aspect the invention provides a method for recovering lubricant from swarf and lubricant material streams. The system includes a basket centrifuge(s) having a housing and a rotatable basket removably attached to a spindle in the housing, the basket having a solid base having a mass sufficient to provide self-balancing rotation of the basket and the basket being configured for receiving a plurality of swarf and lubricant material therein. Rotation of the centrifuge basket applies sufficient centrifugal force to the swarf and lubricant material to cause removal of lubricants therefrom such that the fluids travel through the bag liner, from the basket into an annular area between the basket and the housing and from the housing to a fluid recovery container.

The system includes a trailer, a skid, or motor vehicle containing a power supply, a self-balancing centrifuge having a housing and connected to the power supply for powered operation thereof, the centrifuge being positioned on the vehicle for transport to a remote site containing the swarf and lubricant material, the centrifuge including a housing cover and configured for receiving a plurality of swarf/lubricant material.

The method further includes the steps of charging the swarf and lubricant material into the centrifuge. The centrifuge is charged via a live bottom conveyor via augers or conveyor belts located above the centrifuges. The live bottom conveyor includes discharge chute(s) which allow the swarf and lubricant material to be transported from the live bottom conveyor into the centrifuges. Operating the centrifuge to rotate the basket thereby applying centrifugal forces to the sorbent articles for extractive removal of the lubricant therefrom such that the fluids travel from the basket into an annular area between the basket and the housing. A collection container in flow communication with the annular area is provided for receiving the lubricant removed from the swarf and lubricant material and collecting the removed lubricants. After the lubricants are extracted from the swarf, the bag liner is removed from the basket with the assistance of an overhead crane and the swarf is emptied from the bag liner into a container (roll off dumpster).

The method further includes the steps of charging the swarf/lubricant material into the live bottom conveyor via augers, conveyor belts, and the like. The live bottom conveyor is charged via a portable feed hopper with augers attached and located in close proximity to the live bottom conveyor located above the centrifuges.

An important aspect of the invention is the mobility of the system, which provides on-site recovery of lubricants in an efficient, effective, sustainable and economic manner. The system thus reduces the need to transport relatively large volumes of swarf and lubricant material to a remote location for disposal. Further economies may be achieved in that the system lends itself to use by a service provider who can service a large number of generators of swarf and lubricant material streams. This may save the generators of the swarf and lubricant material significant expense. Furthermore, the cost savings may be so significant as to change the swarf and lubricant material from an expense to a source of revenue for the generator of the swarf and lubricant material.

For example, the service provider is able to use the system at multiple sites, considerable economies of scale may be achieved and the generator need not invest substantial sums of money in equipment to accomplish a task, which a service provider may more economically provide.

Presenting the present inventive process in an easy to understand outline is provided below. The process described may be further understood by reference to the sketches, drawing, and diagrams of FIGS. 1-7 and FIGS. 8A-8C.

Figure 2:
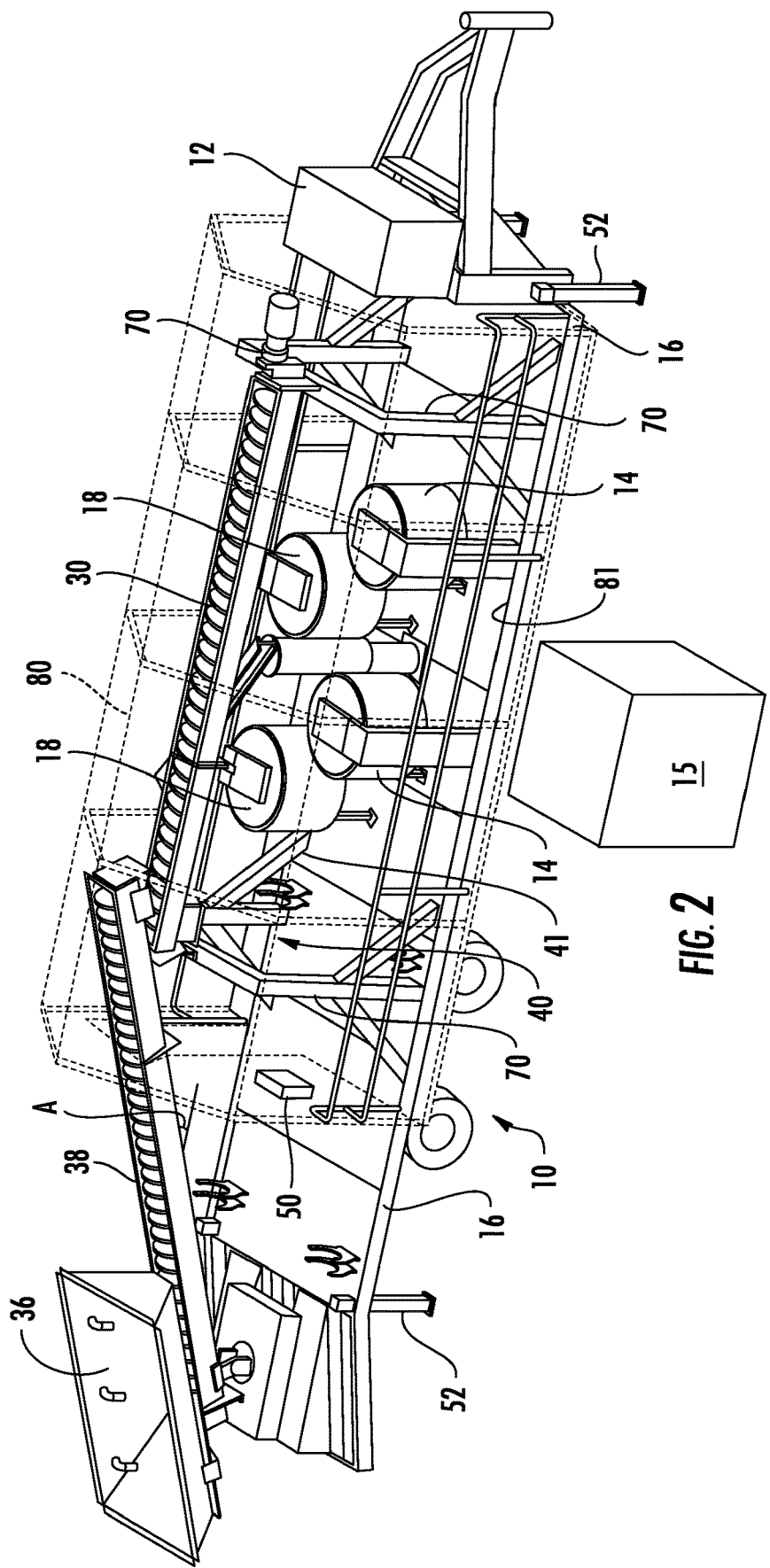
FIG. 2 illustrates a top-right side perspective view of the system showing an oil collection container disposed nearby the vehicle trailer. The covering canopy is shown in broken lines.

The present inventive system 10 includes the following components (See FIGS. 1-7):

1. A motor vehicle (not shown) containing a power supply (truck, truck/trailer combo, semi-truck, skid, boat, barge, etc.). The power supply may be a generator 12 of varying output capacity depending on power demand of the system. The generator is typically powered by diesel, natural gas, or propane.
2. A basket centrifuge(s) 14 operatively connected to the power supply are positioned on the flat deck of the trailer. The centrifuge(s) 14 are mounted on a trailer 16 and include a housing cover 18 and a rotatable basket 20 received within an interior portion of the centrifuge 14 defined by the housing 22 and cover 18 and configured for receiving a plurality of swarf/lubricant material streams. The basket 20 is perforated to allow fluid to flow out of the basket. Various diameter centrifuges may be utilized depending on the swarf material processed. The smaller the diameter of the centrifuge, the greater the g-force required but smaller yield capacity. The larger the diameter of the centrifuge it may handle larger volumes at lower g-forces. Centrifuges with varying weight capacity may be utilized depending on the swarf material processed. Extremely heavy swarf requires a more robust centrifuge with a larger motor (more horse power). Centrifuges may be provided that are customized for specific applications. It is anticipated the system will have from 2-8 self balancing centrifuges installed. FIG. 2 illustrates 4 centrifuges in a staggered pattern. This allows the operators to walk between and service each centrifuge. The live bottom conveyors 30 shown above the centrifuges may be moved or positioned to each side to allow the centrifuge lids to open vertically for bag liner removal.
3. A bag liner 24 inserted into the basket (similar to installing a garbage bag into a garbage can). (See FIG. 7.) The liner 24 may be made of various materials to be compatible with the swarf material. The liner may be custom made to filter various size solid material (i.e. of varying particle size (microns)). The bag retains the solid swarf while allowing the lubricant to exit the basket through the perforated holes.
4. A live bottom conveyor (LBC) 30 for supplying swarf to the centrifuges 14. The live bottom conveyor or an appropriate conveyor system 30 keeps the swarf material in suspension prior to loading the material into the centrifuge. The live bottom conveyor may have chutes 32 similar to those on the back of a cement truck to convey the material from the conveyor system into the centrifuges. (See FIG. 5.)
5. A portable feed hopper 36 with attached augers 38 to supply swarf to the live bottom conveyor 30. The portable feed hopper 36 may vary in capacity in the range of 3 cubic yards. The auger 38 attached to the portable feed hopper may be in two sections and may be removed from the portable feed hopper for transport.
6. A crane(s) 40 for lifting the bag liner 24 out of the basket 20. This may be a jib crane or an articulating boom crane. One jib crane 40 may be installed in a central location on the flat-bed. The crane may reach and service all centrifuges. An alternative configuration provides one jib crane on each side of the trailer to perform the same function.
7. A control panel 50 to monitor and operate all equipment.
8. A self-leveling system 52, as needed, to keep the vehicle level on uneven surfaces.
9. A forklift (not shown) if the swarf material is originally contained in a self-dumping hopper (this may be provided by the customer).
10. A backhoe or excavator (not shown) if the swarf material is originally contained in a roll-off dumpster. This will extract the wet swarf material and dump it into the portable feed hopper with augers attached.

The customer may provide swarf of various types (steel, precious metals, plastic) mixed with various lubricants (water based, oil based). This material is typically contained in a roll-off dumpster or a self-dumping hopper; a container such as a self-dumping hopper or roll-off dumpster to dump the processed (dry) swarf into; and a container such as a tote or tank to hold the extracted lubricant.

Figure 3:
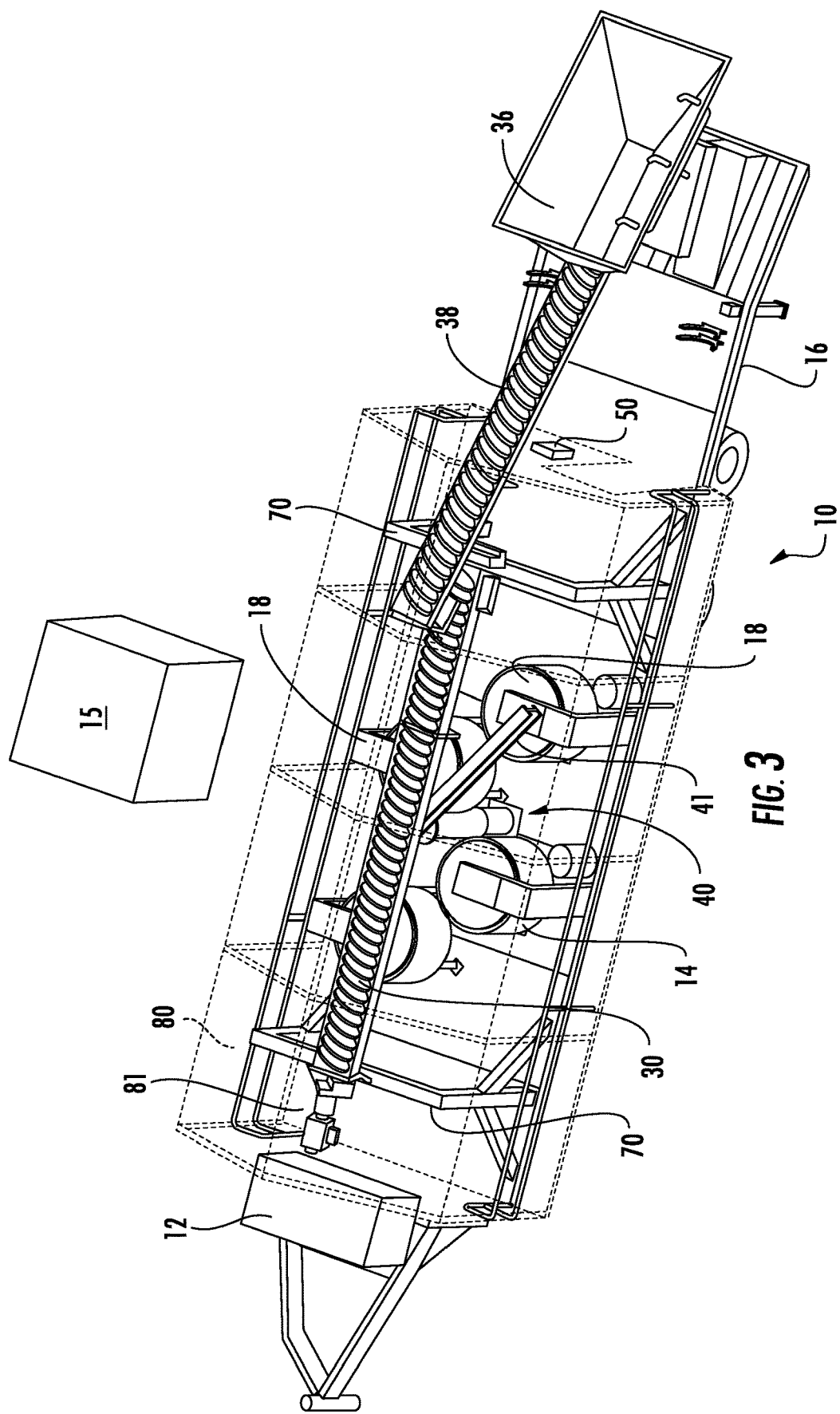
FIG. 3 is a top perspective view of the mobile swarf and lubricant recovery system showing an oil collection container nearby and the canopy in broken lines.
Figure 4:
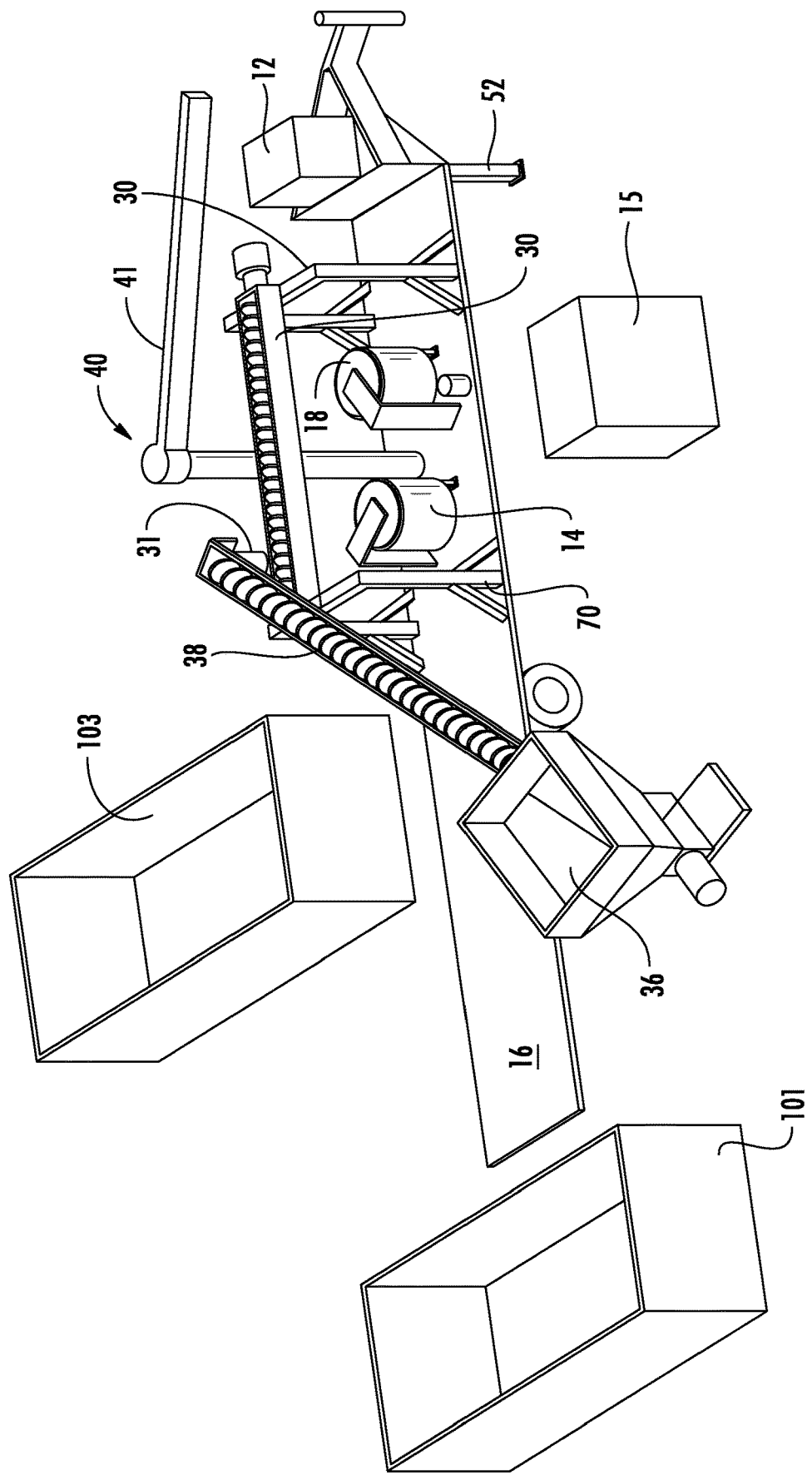
FIG. 4 illustrates the separate components of the system with a flat-bed trailer.
Figure 5:
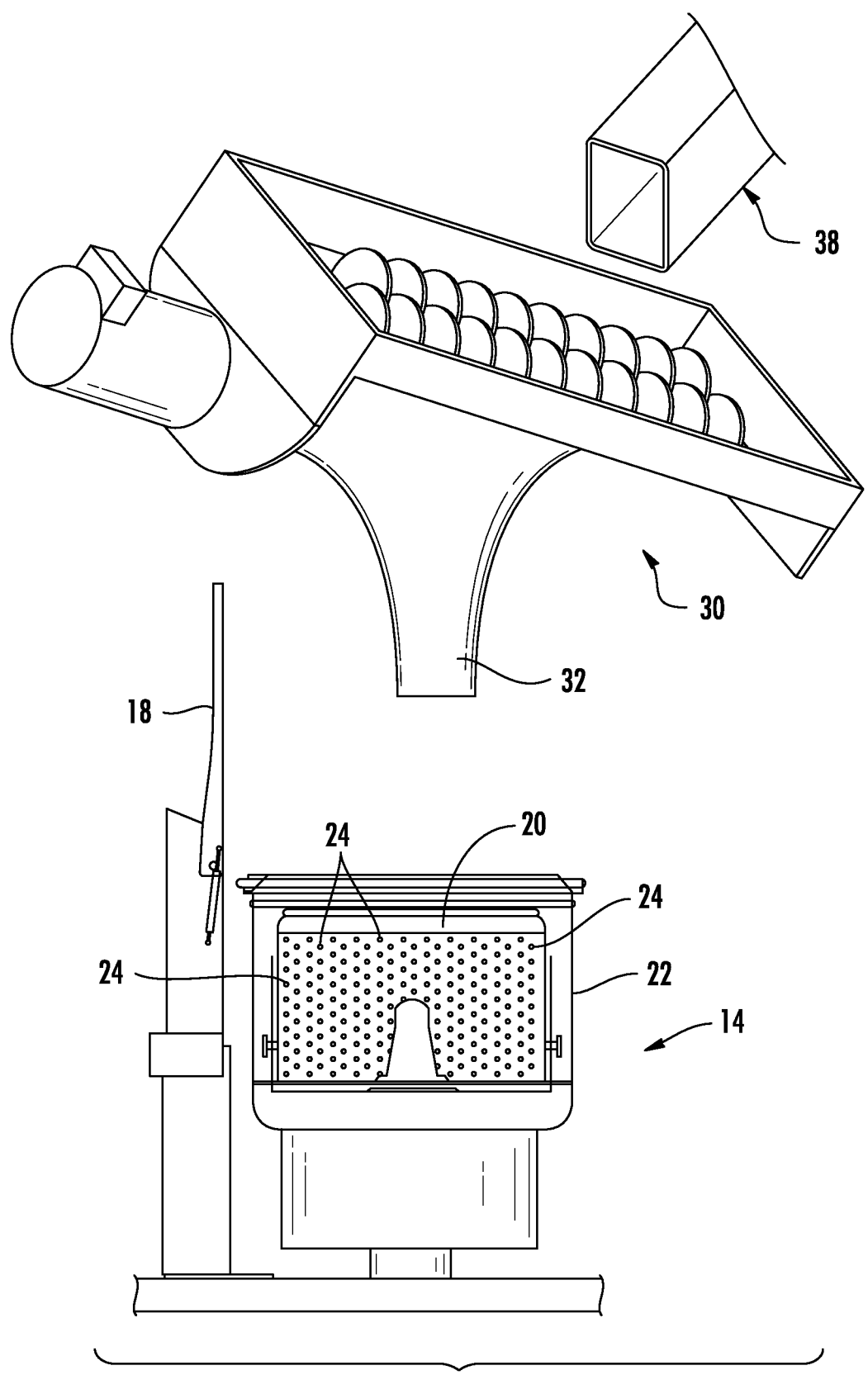
FIG. 5 shows an exploded perspective view of the arrangement of a discharge chute of the swarf feed auger to a live bottom conveyor and a receiving centrifuge with a perforated inner basket.
Figure 6:
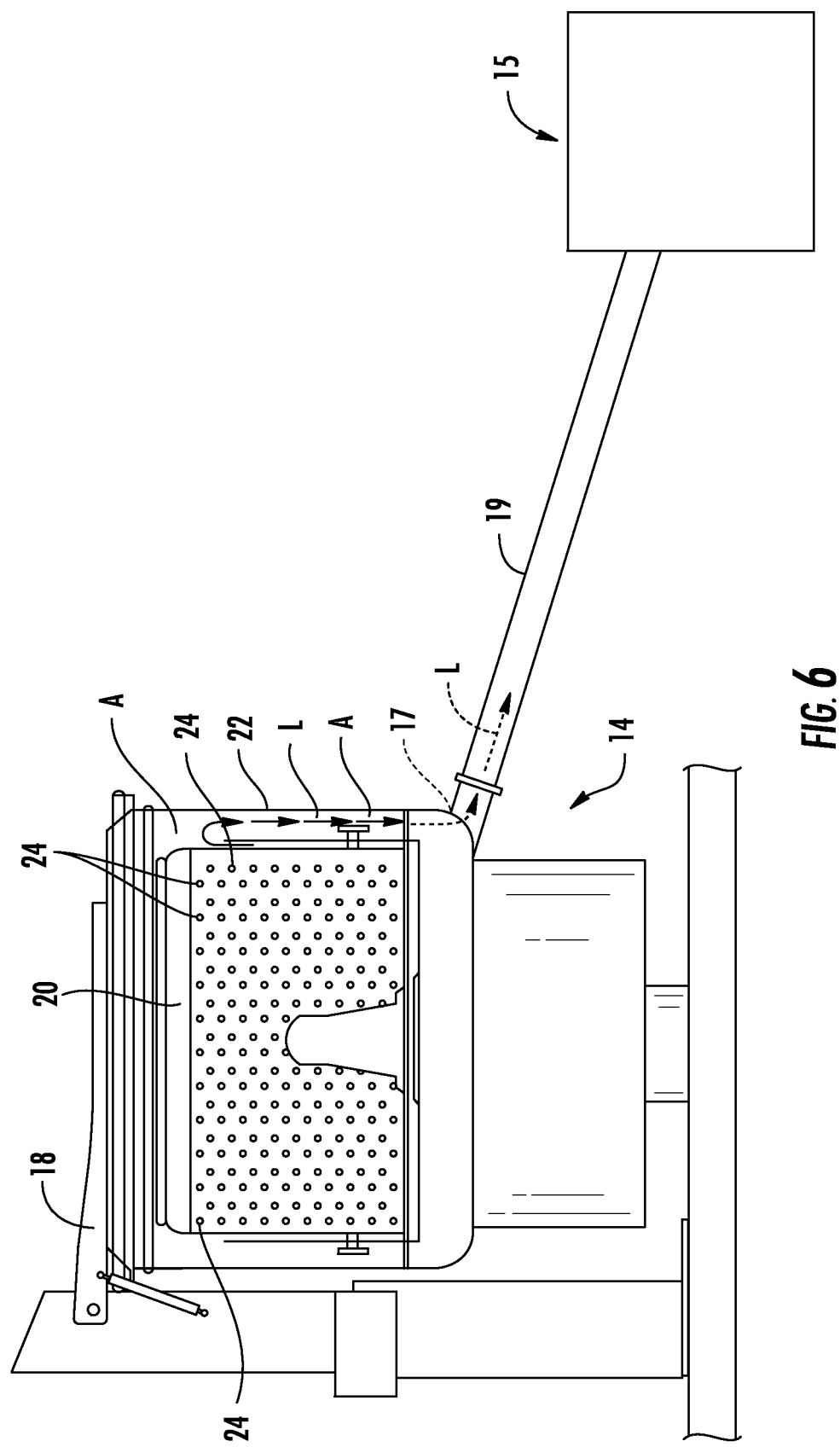
FIG. 6 illustrates a receiving centrifuge with a closed lid and an oil discharge conduit to an oil collection container.
Figure 7:
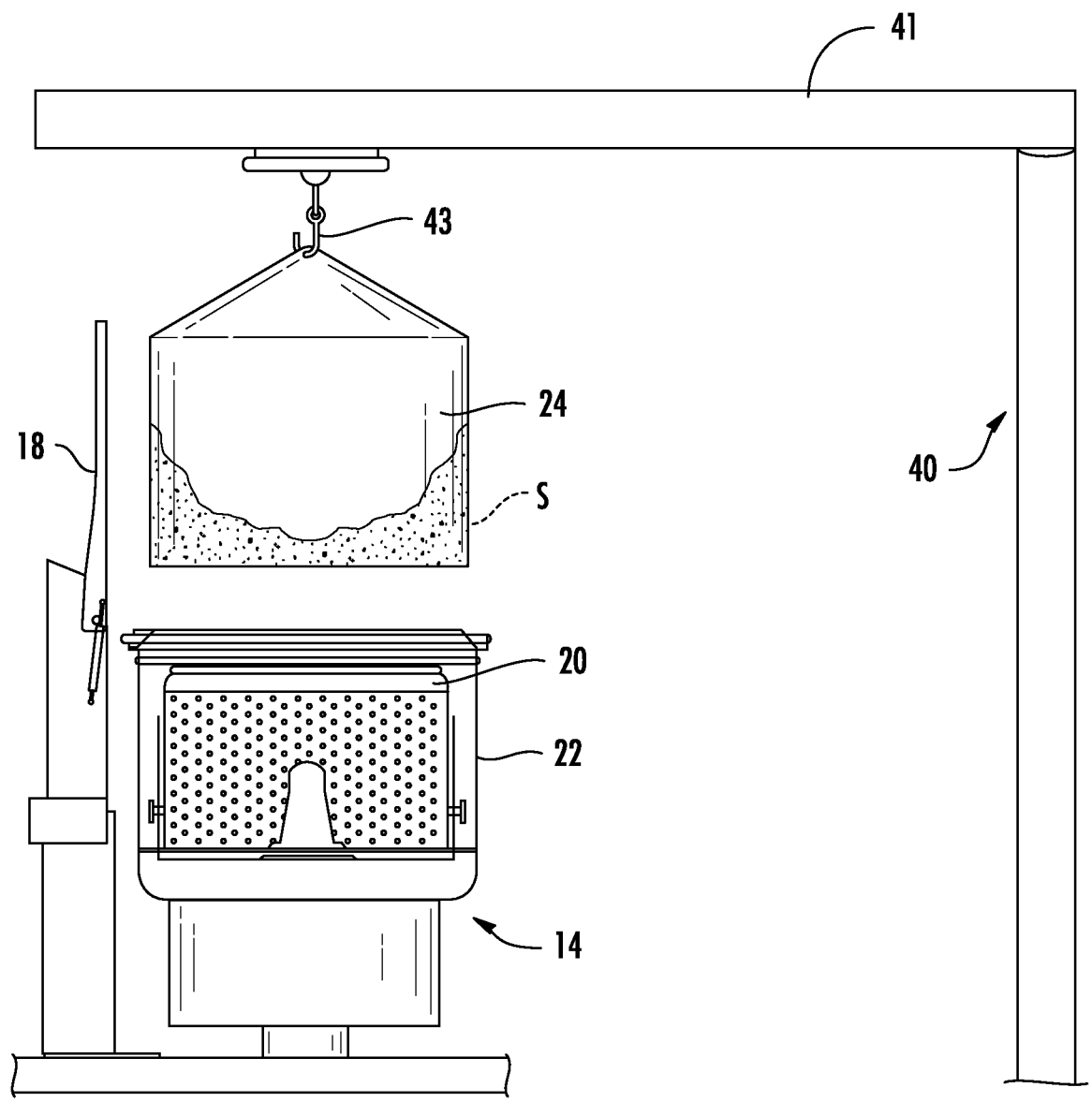
FIG. 7 illustrates a crane with a lifting hook lifting and removing a solids bag liner from the perforated basket inside the centrifuge.
Figure 8A:
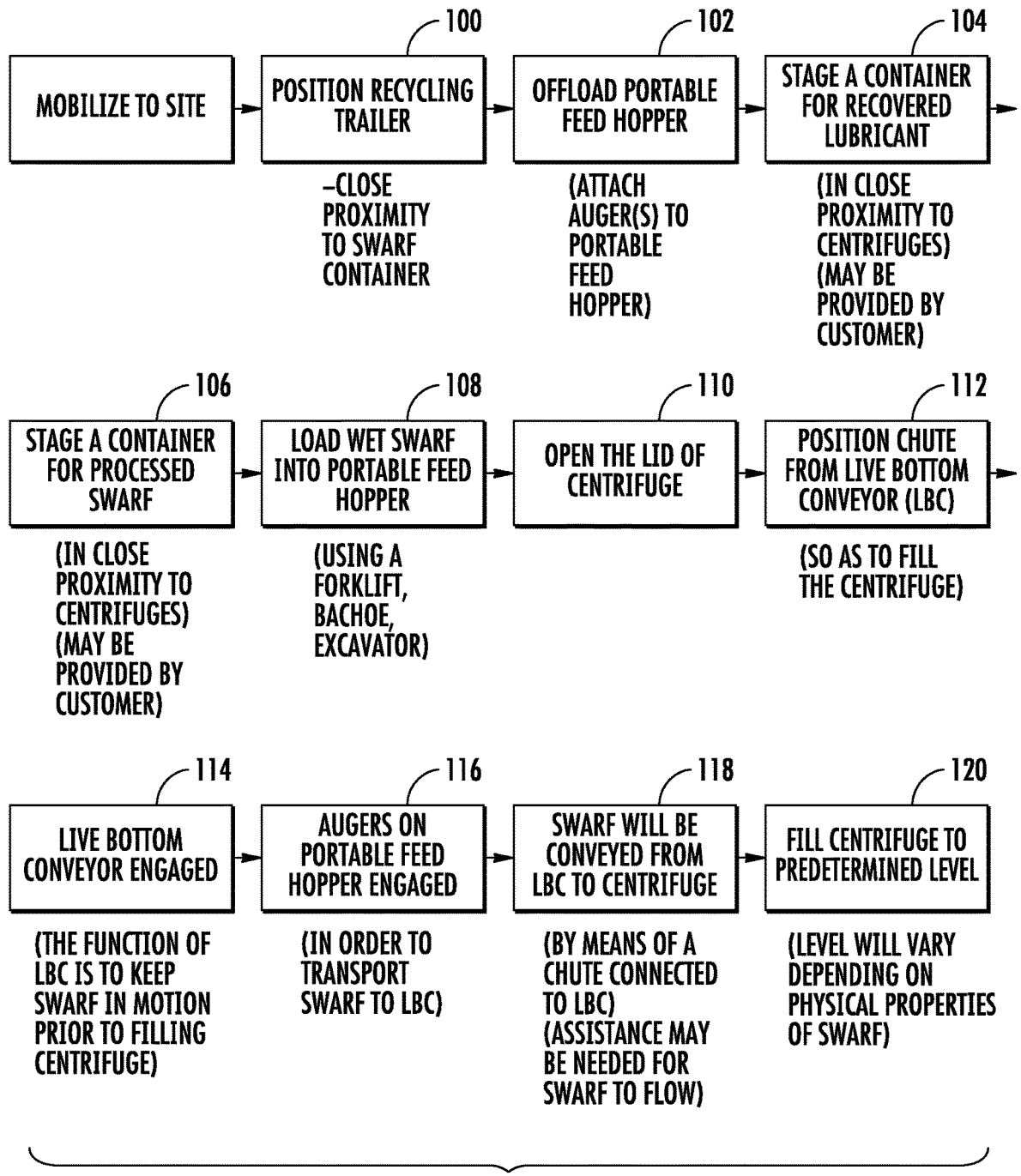
FIGS. 8A-8C illustrate in a flow diagram the method or process of the present swarf and oil recovery system.
Figure 8B:
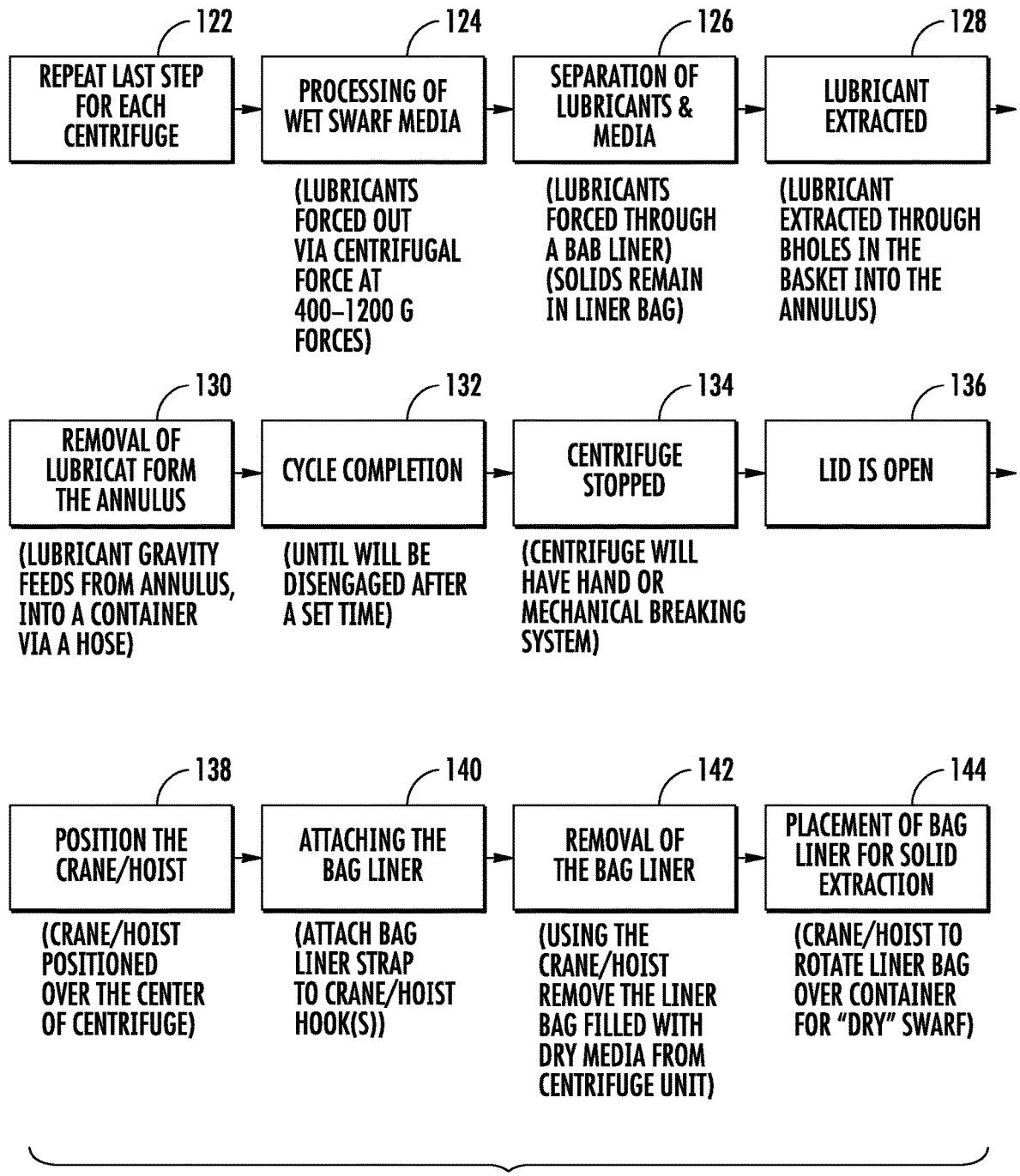
Figure 8C:
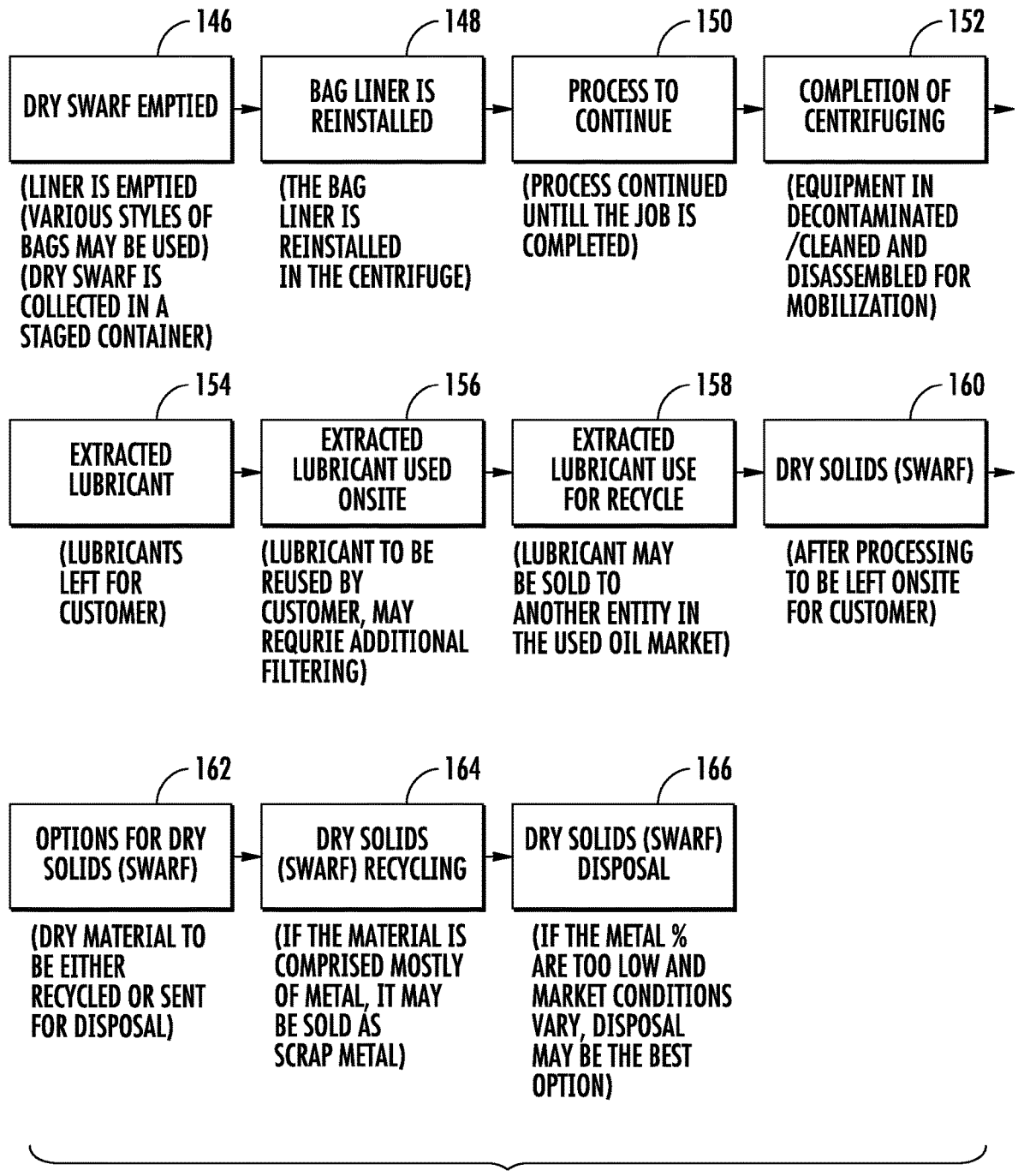

It should be additionally noted that FIGS. 1-3 show a canopy in broken lines for clarity purposes. Canopy and catwalks are set at the same length along the flat-bed of the trailer. This allows work to continue in inclement weather.

FIG. 2 shows that auger 38 is set at an approximate 24 degree angle A1 from the horizontal.

Chain drive controls 50 may be mounted on the I-beam support frame 70 or along a side wall of the canopy 80. Pushbuttons allow the drive to move the auger to each side of the unit.

FIGS. 1-3 illustrate that I-beam support frame 70 structure allows the top mounted live body conveyor 30 to move to each side over the centrifuges to deliver swarf material to the centrifuges.

A preferred process embodiment is detailed in the following steps (see FIGS. 8A-8C):

1. When the customer accumulates a predetermined volume of swarf material, a trailer 16, a skid, or motor vehicle containing the present inventive recycling system 10 is mobilized to the customer's location. The trailer, vehicle, or skid-mounted system may be transported to or assembled at the customer's facility, whichever is most efficient.
2. The vehicle is positioned 100 (FIG. 8A) in close proximity to the swarf material container(s) 101.

3. A portable feed hopper 36 is off-loaded 102 (FIG. 8A) and the augers 38 installed on the portable feed hopper 36.
4. A tote or tank 15, which may be provided by the customer, is staged 104 (FIG. 8A) in close proximity to the vehicle. This tank will accumulate the extracted lubricant.
5. A container for the processed (dry) swarf is staged 106 (FIG. 8A) in close proximity to the vehicle. (See FIG. 4.)
6. The wet swarf material is loaded 108 (FIG. 8A) into the portable feed hopper 36.
   a. If the wet swarf material is contained in a self-dumping hopper then a forklift is utilized to dump the material into the portable feed hopper; or
   b. If the wet swarf material is contained in a roll-off dumpster or similar container then a backhoe or excavator is used to "dig" the material out and dump into the portable feed hopper.
7. The lid 18 of the centrifuge 14 is opened 110 (FIG. 8A).
8. The chute 32 from the live bottom conveyor 30 is positioned 112 (FIG. 8A) so as to fill the centrifuge 14 with swarf material.
9. The live bottom conveyor 30 is activated 114 (FIG. 8A).
10. The augers 38 attached to the portable feed hopper 36 are engaged 116 (FIG. 8A) and transport swarf material to the live bottom conveyor.
11. A valve-type assembly is opened from the live bottom conveyor 30 allowing swarf material to dump 118 (FIG. 8A) into the chute 32 (FIG. 5).
12. Assistance may be required to help the swarf material flow from the chute 32 into the centrifuge 14 (for example, a hoe or shovel may be used).
13. Once a predetermined amount of swarf material is in the centrifuge 120 (FIG. 8A), the lid is closed and the centrifuge is engaged and allowed to operate for a predetermined amount of time.
    a. The amount of time to process the swarf is determined based on the physical properties of the swarf material.
    b. It is possible that the centrifuge is engaged at a low RPM prior to filling the centrifuge and then continues to run at a low RPM while the centrifuge is being filled. This aids in keeping the centrifuge balanced.
       i. If operation occurs as described above, then the centrifuge will be filled to a predetermined amount and then the lid will be closed. The RPM will be increased to a predetermined level and the centrifuge will be allowed to operate for a predetermined amount of time.
14. These steps are repeated 122 (FIG. 8B) for each centrifuge in the system so that multiple centrifuges may be operating at the same time.
15. As the centrifuge processes 124 (FIG. 8B) the wet swarf material, the lubricant L will be forced out due to centrifugal force (See FIG. 6).
    a. The amount of centrifugal force will vary depending on the swarf material being processed but is normally in the range from 400-1200 G forces.
16. The lubricant L is forced through the bag liner 24 and the solid portion S of the swarf material S remains in the bag, thus filtering the lubricant L 126 (FIG. 8B).
17. The lubricant L passes 128 (FIG. 8B) from the bag liner 24 through the perforated holes 21 in the basket 20 and into the annulus A between the basket 20 and the centrifuge housing 22.
18. Gravity forces the lubricant L to the bottom of the centrifuge housing 22 and the lubricant flows out 130 (FIG. 8B) of the centrifuge housing via an outlet 17 in the housing
22. A hose(s) 19 may be attached to the outlet on the housing of the centrifuge and conveys the lubricant into the container 15 utilized to contain the processed lubricant (i.e. a tote or tank).
19. Once the centrifuges have completed the cycle (a predetermined amount of time) they are disengaged 132 (FIG. 8B).
20. The centrifuge is allowed sufficient time to come to a complete stop 134 (FIG. 8B).
21. Once the centrifuge has stopped the lid is opened 136 (FIG. 8B).
22. A crane/hoist 40 is positioned 138 (FIG. 8B) over the centrifuge 14.
23. The crane/hoist 40 is attached to the bag liner 140 (FIG. 8B).
24. The bag liner 24 is lifted out 142 (FIG. 8B) of the centrifuge.
25. The crane/hoist is rotated so that the bag liner is positioned 144 (FIG. 8B) over the container 103 (FIG. 4) staged to receive the processed (dry) swarf.
26. The bag liner 24 is dumped 146 (FIG. 8C) and the processed (dry) swarf falls into the staged container.
    a. Various types of bags may be utilized.
       i. Some bag liners may have a drawstring on the bottom of them that can be pulled allowing the contents to fall out.
       ii. Some bag liners may have loops sewn into them and the dumping will require manual assistance.
27. The bag liner is reinstalled 148 (FIG. 8C) in the centrifuge.
28. These steps are continued 150 (FIG. 8C) until the job is finished.
29. At the end of the job, all equipment is cleaned and disassembled 152 (FIG. 8C) as needed for mobilization off-site.
30. The lubricant is left with the customer 154 (FIG. 8C).
    a. The lubricant will likely be reused 156 (FIG. 8C) by the customer
       i. If needed, the lubricant may be filtered with additional equipment in order to clean the lubricant to a certain specification.
    b. It is possible the lubricant may be sold 158 (FIG. 8C) by the customer to another entity that will reuse or recycle the lubricant.
31. The solid (dry) swarf is left with the customer 160 and 162 (FIG. 8C).
    a. If it is comprised of mostly metal it may be sold as scrap metal 164 (FIG. 8C).
    b. It is possible that it may require disposal 166 (FIG. 8C).
       i. If this is the case a great benefit of the present process is still realized since the liability will be reduced by removing the lubricant.
       ii. Additional benefit is found in reducing the volume and weight of the material to be disposed. This lowers disposal cost and also reduces the amount of material placed in a landfill.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary illustrations. As will become apparent to one of ordinary skill in the art after reading this document, the illustrated embodiments and their various alternatives can be implemented without confinement to the illustrated examples.

What is claimed is:

1. A system for swarf and lubricant recovery comprising:
   one or more basket centrifuges having removable bag liners;
   a mobile skid or platform for securing said one or more basket centrifuges having removable bag liners;
   a portable swarf feed hopper mountable on said skid, said hopper movable from a first transport position to a second operating position whereby swarf containing liquid lubricant placed in said hopper is deliverable via a feed auger or conveyor to a live bottom conveyor for delivery to said one or more basket centrifuges, said live bottom conveyor adapted for transport on said skid;
   a crane subsystem mounted on said skid and adapted to position a lifting member above said centrifuges for inserting empty bag liners and removing filled bag liners from said centrifuges;
   a discharge port in said centrifuge for discharging reclaimed lubricant from said swarf delivered to said centrifuge after operation of said centrifuge, said port connected to a conduit for delivery of said reclaimed lubricant to a collection container; and
   a power source and controls on said skid for activating said feed auger or conveyor, said live bottom conveyor, said centrifuges, and said crane subsystem.

2. The system of claim 1 wherein a plurality of centrifuges are positioned in a staggered pattern on said skid such that an operator can move between and service each centrifuge.

3. The system of claim 1 further comprising: an I-beam frame for supporting said live bottom conveyor above said centrifuges.

4. The system of claim 1 further comprising: a canopy surrounding an upper end of said feed auger when said feed auger is in an operating position, said live bottom conveyors, said centrifuges, and catwalks extending the length of said skid, said canopy providing protection for operators and equipment in inclement weather.

5. The system of claim 1 wherein said skid is provided with scoping levelers on support legs.

6. The system of claim 3 wherein said controls for activating said auger, said conveyor, said centrifuges, and said crane subsystem are mounted on said I-beam frame.

7. A method for swarf and lubricant recovery comprising the steps of: mobilizing the system for swarf and lubricant recovery of claim 1 to a swarf treatment site;
   positioning said mobile skid of claim 1 in close proximity to a swarf container;
   offloading said portable feed hopper of claim 1;
   staging said collection container of claim 1 in close proximity to said centrifuges of claim 1;
   staging a container to receive processed swarf from said bag liners of claim 1;
   loading wet swarf from said swarf container into said portable hopper;
   lifting open a lid of said centrifuge of claim 1 having said bag liner therein;
   positioning said live bottom conveyor of claim 1 above said centrifuge;
   activating said live bottom conveyor to keep said wet swarf in motion prior to filling said centrifuge;

activating said portable feed hopper to transport said wet swarf to said live bottom conveyor;

conveying said wet swarf from said live bottom conveyor to said centrifuge;

filling centrifuge to a predetermined level;

repeating fill step for each said centrifuge;

closing each of said open lids;

activating centrifuge to force lubricants out of said wet swarf;

continuing centrifuge activation until said lubricants are forced through said bag liner with swarf solids remaining in said bag liner, said lubricants being forced through said basket of said centrifuge, through said centrifuge annulus, and into a reclaimed lubricant container of claim 1;

deactivating said centrifuge;

opening each of said centrifuge lids;

positioning said crane subsystem of claim 1 with said lifting member above said centrifuge;

attaching said lifting member to said bag liner to remove said liner from said centrifuge;

placing bag liner with processed swarf over a processed swarf container for disposal; and installing a fresh bag liner into said centrifuge for continued processing of wet swarf.

* * * * *